United States Patent
Karna et al.

(10) Patent No.: US 11,010,801 B2
(45) Date of Patent: May 18, 2021

(54) METHOD, SYSTEM, AND COMPUTER PROGRAM PRODUCT FOR TRANSPARENCY VIA OPT-IN AGGREGATION

(71) Applicant: International Business Machines Corporation, Armonk, NY (US)

(72) Inventors: Geetha Karna, Bengaluru (IN); Danish Contractor, Gurgaon (IN); Sreekanth Kakaraparthy Lakshmi, Bengaluru (IN); Kuntal Dey, New Delhi (IN)

(73) Assignee: International Business Machines Corporation, Armonk, NY (US)

( * ) Notice: Subject to any disclaimer, the term of this patent is extended or adjusted under 35 U.S.C. 154(b) by 126 days.

(21) Appl. No.: 16/244,677

(22) Filed: Jan. 10, 2019

(65) Prior Publication Data

US 2020/0226652 A1    Jul. 16, 2020

(51) Int. Cl.
*G06Q 30/00* (2012.01)
*G06Q 30/06* (2012.01)

(52) U.S. Cl.
CPC ..... *G06Q 30/0605* (2013.01); *G06Q 30/0611* (2013.01); *G06Q 30/0641* (2013.01)

(58) Field of Classification Search
None
See application file for complete search history.

(56) References Cited

U.S. PATENT DOCUMENTS

| 8,660,936 B1 | 2/2014 | Banke et al. |
| 2005/0160014 A1 | 7/2005 | Moss et al. |
| 2005/0197897 A1 | 9/2005 | Veit et al. |
| 2006/0089842 A1 | 4/2006 | Medawar |
| 2007/0073593 A1 | 3/2007 | Perry et al. |
| 2008/0208606 A1 | 8/2008 | Allsop et al. |

(Continued)

FOREIGN PATENT DOCUMENTS

WO    2014004492 A1    1/2014

OTHER PUBLICATIONS

Franciosi, R., Kujal, P., Michelitsch, R., Smith, V., & Deng, G., Fairness: effect on temporary and equilibrium prices in posted-offer markets, (1995), The Economic Journal, 105(431), 938-950. (Year: 1995).*

(Continued)

*Primary Examiner* — Jeffrey A. Smith
*Assistant Examiner* — Timothy J Kang
(74) *Attorney, Agent, or Firm* — Yee & Associates, P.C.

(57) ABSTRACT

Price transparency via aggregation of real-time quoted prices is provided. Real-time quoted service price data corresponding to a service application is collected from registered client devices. The real-time quoted service price data corresponding to the service application is aggregated. It is determined whether a price quoted to a client device by the service application is fair based on the aggregated real-time quoted service price data. In response to determining that the price quoted to the client device by the service application is unfair, a graphical input button is provided within a price transparency display on the client device that enables a user of the client device to send a complaint to a service provider corresponding to the service application with a price transparency log.

19 Claims, 6 Drawing Sheets

(56) References Cited

U.S. PATENT DOCUMENTS

| | | | |
|---|---|---|---|
| 2009/0018965 A1* | 1/2009 | Neydavood | G06Q 50/188 |
| | | | 705/80 |
| 2013/0138477 A1 | 5/2013 | Wilkins et al. | |
| 2013/0268409 A1* | 10/2013 | Chhajlani | G06Q 30/0601 |
| | | | 705/26.62 |
| 2014/0214518 A1 | 7/2014 | Hatch et al. | |
| 2014/0324570 A1* | 10/2014 | Lawrence | G06Q 50/01 |
| | | | 705/14.44 |
| 2015/0073973 A1 | 3/2015 | Fuller et al. | |
| 2015/0363842 A1* | 12/2015 | Hoyne | G06Q 30/0283 |
| | | | 705/7.35 |
| 2015/0379601 A1 | 12/2015 | Ouimet | |
| 2016/0055507 A1* | 2/2016 | Patil | G06Q 30/0206 |
| | | | 705/7.31 |
| 2017/0293772 A1* | 10/2017 | Chen | G06F 21/6227 |

OTHER PUBLICATIONS

SkyScanner.com, accessed on Nov. 7, 2018, 4 pages, https://www.skyscanner.com/.

Trivago.com, accessed on Nov. 7, 2018, 4 pages, https://www.trivago.com/.

TaxiFareFinder.com, accessed on Nov. 7, 2018, 31 pages, https://www.taxifarefinder.com/?lang=en.

\* cited by examiner

METHOD, SYSTEM, AND COMPUTER PROGRAM PRODUCT FOR TRANSPARENCY VIA OPT-IN AGGREGATION

BACKGROUND

1. Field

The disclosure relates generally to online price comparison and more specifically to price transparency via user opt-in aggregation of real-time quoted prices for the same or similar product or service to determine whether a quoted price received by a particular user is fair or not based on comparison of quoted prices.

2. Description of the Related Art

Price comparison is when the price of the same product or service is compared. Online comparison shopping helps customers discover the best deals. With a multitude of price comparison shopping engines and discount shopping websites currently available, it's becoming easier for customers to find these deals. For example, when customers are looking to compare flight prices or hotel prices online.

A price comparison shopping engine, also known as a price comparison website, price analysis tool, comparison shopping agent, or shopbot, is a vertical search engine that shoppers use to filter and compare products and services based on price, features, reviews, and other criteria. Most price comparison shopping engines aggregate product and service listings from many different providers, but do not directly sell products or services themselves.

Price comparison shopping engines provide ecommerce merchants an opportunity to attract new customers, increase sales, and go head-to-head against their competition. Price comparison shopping engines are channels for collecting product and service information, which includes pricing, from participating merchants and then display that collective information on a single results page in response to a shopper's search query. In this way, shoppers can compare options, prices, and services from multiple merchants on a single page and choose the merchant that offers the best overall value for the quoted price. Typically, users of price comparison shopping engines have already made the decision to purchase a product or service and are simply looking for the best price.

SUMMARY

According to one illustrative embodiment, a computer-implemented method for price transparency via aggregation of real-time quoted prices is provided. A computer collects real-time quoted service price data corresponding to a service application from registered client devices. The computer aggregates the real-time quoted service price data corresponding to the service application. The computer determines whether a price quoted to a client device by the service application is fair based on the aggregated real-time quoted service price data. In response to determining that the price quoted to the client device by the service application is unfair, the computer provides a graphical input button within a price transparency display on the client device that enables a user of the client device to send a complaint to a service provider corresponding to the service application with a price transparency log. According to other illustrative embodiments, a computer system and computer program product for price transparency via aggregation of real-time quoted prices are provided.

DETAILED DESCRIPTION

Figure 1:
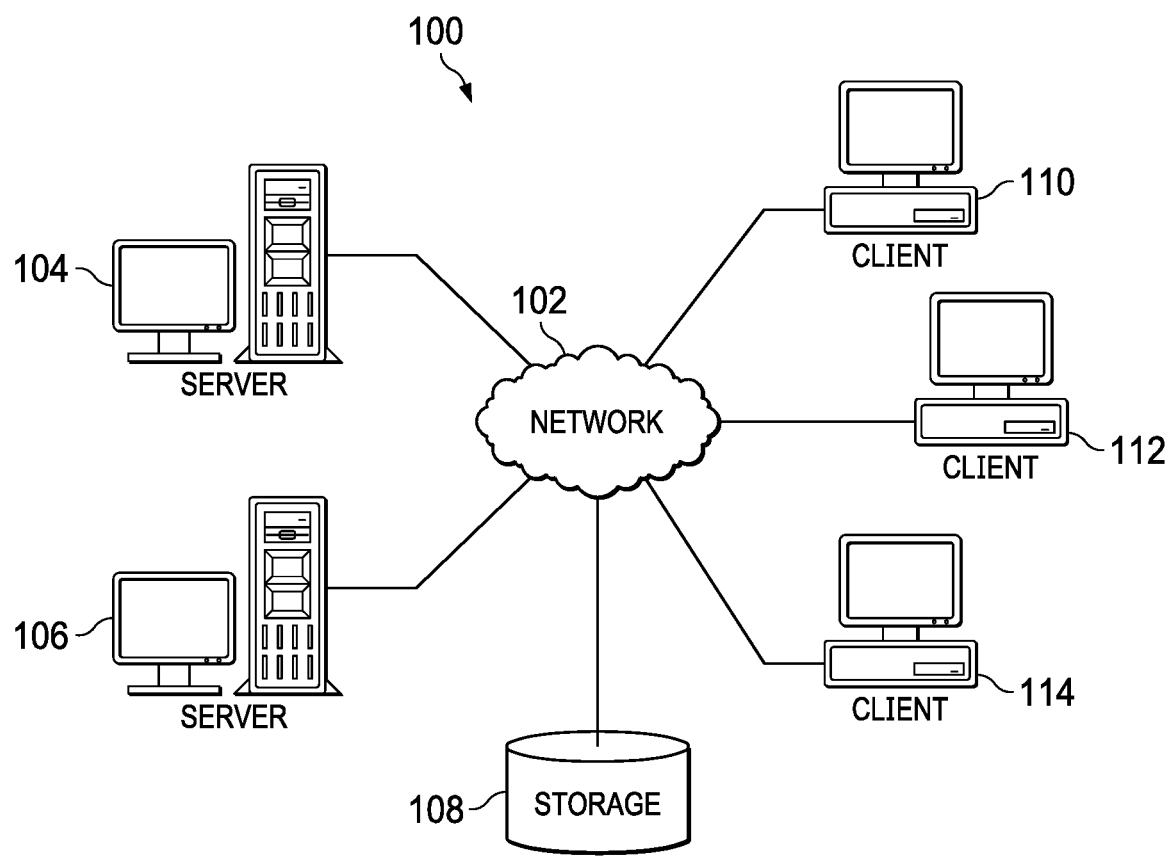
FIG. 1 is a pictorial representation of a network of data processing systems in which illustrative embodiments may be implemented.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Figure 2:
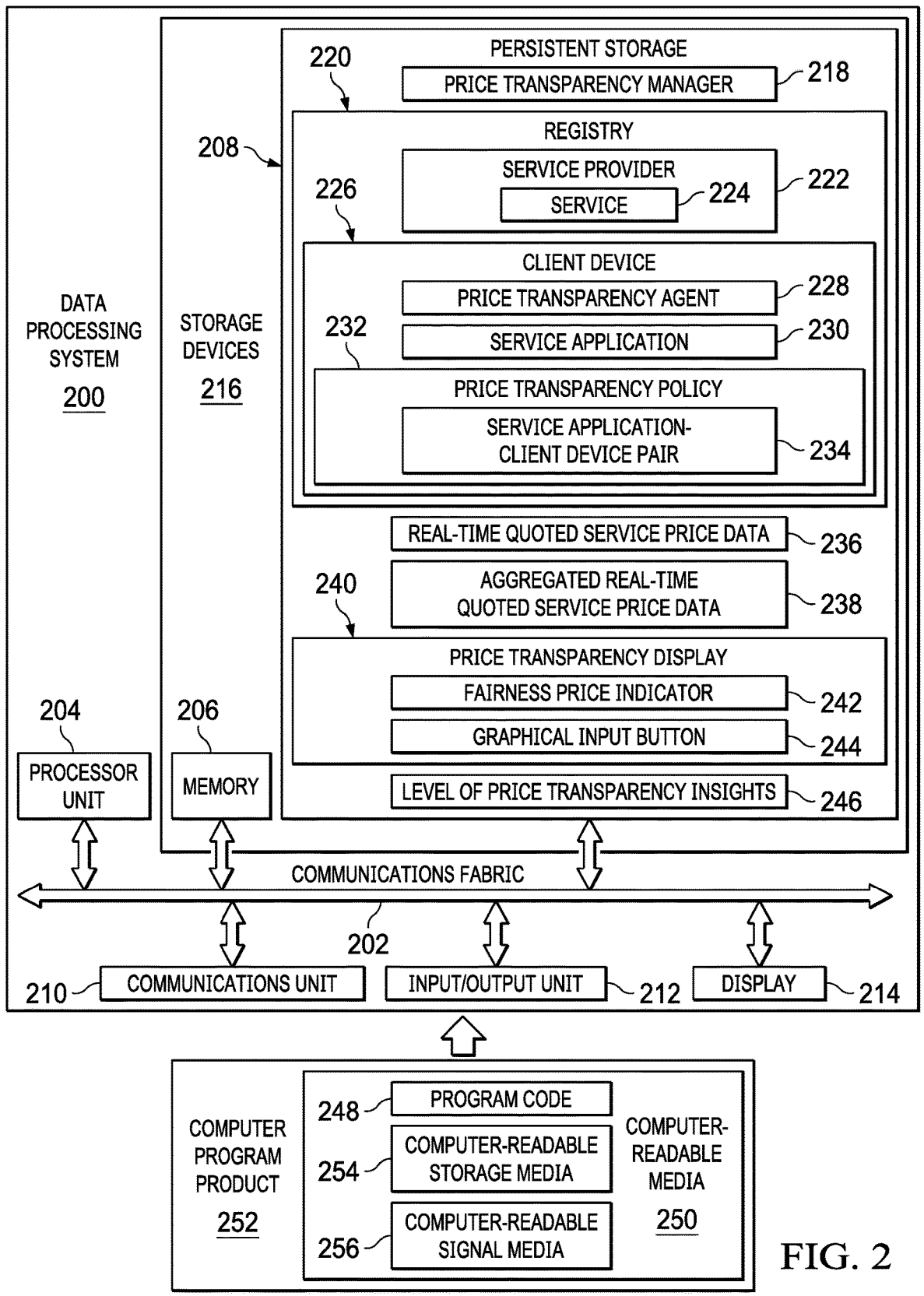
FIG. 2 is a diagram of a data processing system in which illustrative embodiments may be implemented.
Figure 3:
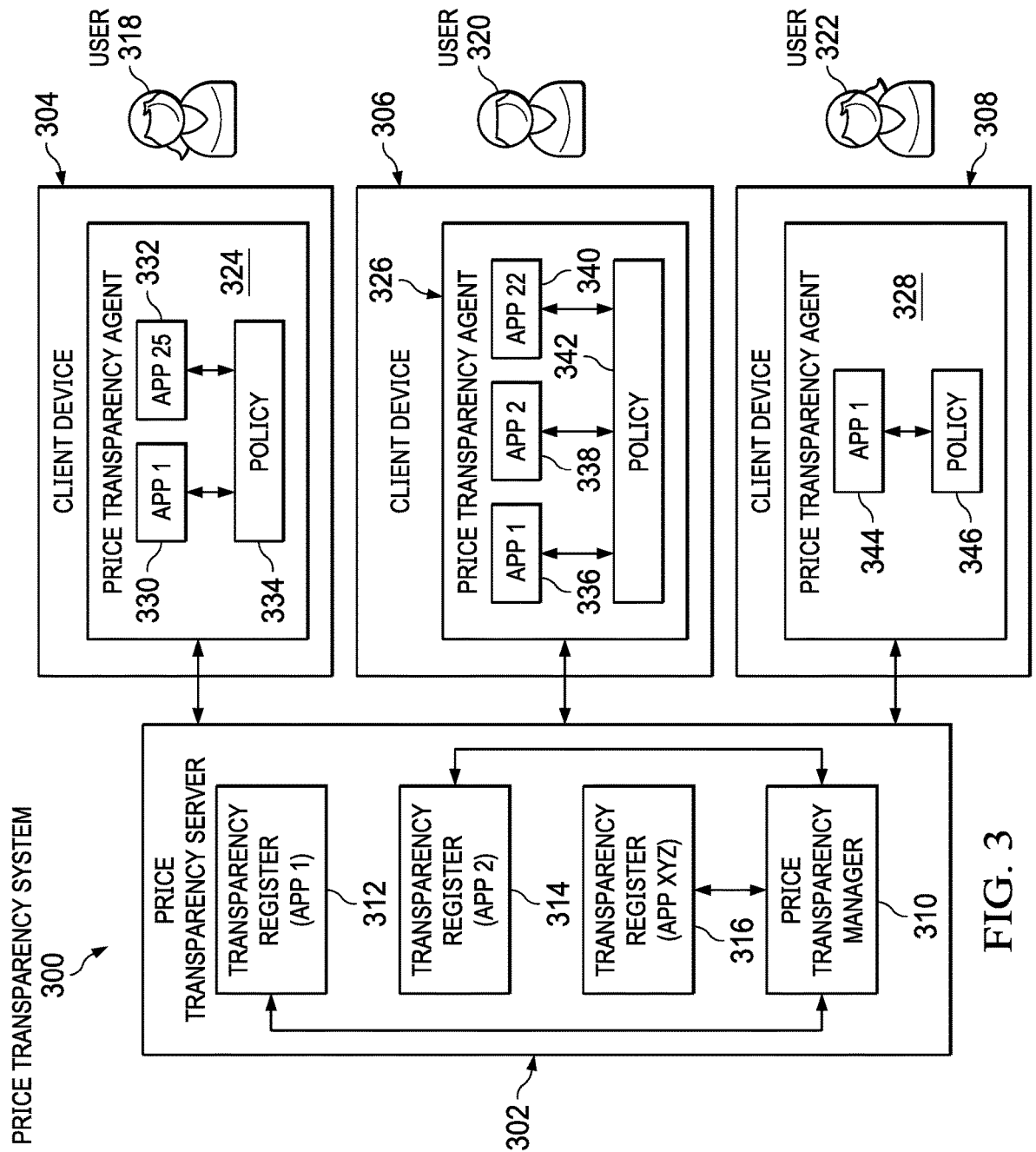
FIG. 3 is a diagram illustrating an example of a price transparency system in accordance with an illustrative embodiment.

With reference now to the figures, and in particular, with reference to FIGS. 1-3, diagrams of data processing environments are provided in which illustrative embodiments may be implemented. It should be appreciated that FIGS. 1-3 are only meant as examples and are not intended to assert or imply any limitation with regard to the environments in which different embodiments may be implemented. Many modifications to the depicted environments may be made.

FIG. 1 depicts a pictorial representation of a network of data processing systems in which illustrative embodiments may be implemented. Network data processing system 100 is a network of computers, data processing systems, and other devices in which the illustrative embodiments may be implemented. Network data processing system 100 contains network 102, which is the medium used to provide communications links between the computers, data processing systems, and other devices connected together within network data processing system 100. Network 102 may include connections, such as, for example, wire communication links, wireless communication links, and fiber optic cables.

In the depicted example, server 104 and server 106 connect to network 102, along with storage 108. Server 104 and server 106 may be, for example, server computers with high-speed connections to network 102. In addition, server 104 and server 106 may be price transparency server computers that provide a set of one or more price transparency services to registered client devices. Server 104 and server 106 provide the price transparency service by aggregating real-time quoted prices for one or more requested services, which the servers receive from a plurality of registered client devices, to determine whether a price quoted to a particular client device user for a particular service is fair or not based on comparing the price quoted to that particular client device user with aggregated real-time quoted prices for that particular service. It should be noted that as used herein, the term "service" may include a product. Server 104 and server 106 indicate whether quoted prices are fair or not using a fairness price indicator, such as, for example, different color highlighting of quoted prices, within a price transparency display on registered client devices. Also, it should be noted that server 104 and server 106 may each represent a cluster of servers in a data center. Alternatively, server 104 and server 106 may each represent computing nodes in a cloud environment that hosts the price transparency service. Further, server 104 and server 106 may provide information, such as, for example, software applications and programs, software updates, software patches, and the like, to registered client devices.

Client 110, client 112, and client 114 also connect to network 102. Clients 110, 112, and 114 are registered client devices of server 104 and/or server 106. In this example, clients 110, 112, and 114 are shown as desktop or personal computers with wire communication links to network 102. However, it should be noted that clients 110, 112, and 114 are examples only and may represent other types of data processing systems, such as, for example, laptop computers, handheld computers, smart phones, smart watches, smart televisions, personal digital assistants, gaming devices, and the like. Users of clients 110, 112, and 114 may utilize clients 110, 112, and 114 to access and utilize the price transparency services provided by server 104 and server 106.

Storage 108 is a network storage device capable of storing any type of data in a structured format or an unstructured format. In addition, storage 108 may represent a plurality of network storage devices. Further, storage 108 may store identifiers and network addresses for one or more service provider servers, identifiers for one or more service applications corresponding to the service providers, identifiers and network addresses for a plurality of different client devices, identifiers for a plurality of different client device users, and the like. Furthermore, storage unit 108 may store other types of data, such as authentication or credential data that may include user names, passwords, and biometric data associated with client device users and system administrators, for example.

In addition, it should be noted that network data processing system 100 may include any number of additional server computers, client devices, storage devices, and other devices not shown. Program code located in network data processing system 100 may be stored on a computer readable storage medium and downloaded to a computer or other data processing device for use. For example, program code may be stored on a computer readable storage medium on server 104 and downloaded to client 110 over network 102 for use on client 110.

In the depicted example, network data processing system 100 may be implemented as a number of different types of communication networks, such as, for example, an internet, an intranet, a local area network (LAN), a wide area network (WAN), or any combination thereof. FIG. 1 is intended as an example only, and not as an architectural limitation for the different illustrative embodiments.

With reference now to FIG. 2, a diagram of a data processing system is depicted in accordance with an illustrative embodiment. Data processing system 200 is an example of a computer, such as server 104 in FIG. 1, in which computer readable program code or instructions implementing processes of illustrative embodiments may be located. In this illustrative example, data processing system 200 includes communications fabric 202, which provides communications between processor unit 204, memory 206, persistent storage 208, communications unit 210, input/output (I/O) unit 212, and display 214.

Processor unit 204 serves to execute instructions for software applications and programs that may be loaded into memory 206. Processor unit 204 may be a set of one or more hardware processor devices or may be a multi-core processor, depending on the particular implementation.

Memory 206 and persistent storage 208 are examples of storage devices 216. A computer readable storage device is any piece of hardware that is capable of storing information, such as, for example, without limitation, data, computer readable program code in functional form, and/or other suitable information either on a transient basis and/or a persistent basis. Further, a computer readable storage device excludes a propagation medium. Memory 206, in these examples, may be, for example, a random-access memory (RAM), or any other suitable volatile or non-volatile storage device. Persistent storage 208 may take various forms, depending on the particular implementation. For example, persistent storage 208 may contain one or more devices. For example, persistent storage 208 may be a hard drive, a flash memory, a rewritable optical disk, a rewritable magnetic tape, or some combination of the above. The media used by persistent storage 208 may be removable. For example, a removable hard drive may be used for persistent storage 208.

In this example, persistent storage 208 stores price transparency manager 218. However, it should be noted that even though price transparency manager 218 is illustrated as residing in persistent storage 208, in an alternative illustrative embodiment price transparency manager 218 may be a separate component of data processing system 200. For example, price transparency manager 218 may be a hardware component coupled to communication fabric 202 or a combination of hardware and software components. In another alternative illustrative embodiment, a first set of components of price transparency manager 218 may be located in data processing system 200 and a second set of components of price transparency manager 218 may be located in a second data processing system, such as, for example, client 110 in FIG. 1. In yet another alternative illustrative embodiment, price transparency manager 218 may be located client devices in addition to, or instead of, data processing system 200.

Price transparency manager 218 controls the process of aggregating real-time quoted prices corresponding to registered services to determine whether a price quoted to a client device user for a particular service is fair based on comparing the price quoted to that client device user with aggregated real-time quoted prices for that particular service and indicating whether the quoted price is fair or not within a price transparency display using a fairness price indicator. Price transparency manager 218 maintains registry 220. Registry 220 represents listings of registered service providers and client devices, along with service applications and price transparency policies.

Service provider 222 represents an identifier of a registered provider of service 224. For example, service provider 222 may represent an identifier for a taxi cab company that provides a taxi cab service for transporting customers to different locations. However, service provider 222 may represent any type of service provider and may also represent one or more different types of service providers. Similarly, service 224 may represent any type of service or product, which may be provided by service provider 222.

Client device 226 represents an identifier of a registered user client device, such as, for example, client 110 in FIG. 1. In addition, client device 226 may represent a plurality of different registered user client devices. In this example, client device 226 includes price transparency agent 228, service application 230, and price transparency policy 232. Price transparency agent 228 represents an identifier of a price transparency software agent that price transparency manager 218 uploaded to client device 226 after client device 226 registered with price transparency manager 218. Price transparency agent 228 is program code that enables two-way communication of price transparency information between price transparency manager 218 and client device 226.

Service application 230 represents an identifier of a software application that requests service 224 from service provider 222. Also, it should be noted that service application 230 may represent any number of different service applications loaded on client device 226 for requesting any number of different registered services. Price transparency policy 232 represents an identifier of a policy defined by a user of client device 226 for sharing information from service application 230.

Price transparency policy 232 includes service application-client device pair 234. Service application-client device pair 234 defines the relationship between service application 230 and client device 226 in price transparency policy 232. In addition, price transparency policy 232 also defines a set of attributes or rules, such as, for example, setting the type and amount of data to send from service application 230 to service provider 222. The type and amount of data may include, for example, geolocation of client device 226, time information associated with service 224 that corresponds to service application 230, geographic information associated with where service 224 is to be performed, payment information associated with service 224, and the like.

Real-time quoted service price data 236 represent a plurality of quoted prices for service 224, which was received by a plurality of other registered client devices for service 224, and sent to price transparency manager 218 in real-time by the plurality of other registered client devices. Price transparency manager 218 analyzes and aggregates real-time quoted service price data 236 to form aggregated real-time quoted service price data 238. Price transparency manager 218 utilizes aggregated real-time quoted service price data 238 to calculate, for example, the average price, minimum price, maximum price, mean price, and the like, for service 224. Further, price transparency manager 218 compares a price quote for service 224 received by client device 226 with aggregated real-time quoted service price data 238 to determine whether the price quote is a fair price or an unfair price for service 224.

Price transparency manager 218 outputs the determination as to whether the price quote for service 224 is fair or unfair in price transparency display 240 using fairness price indicator 242. Price transparency manager 218 presents price transparency display 240 on client device 226 for user review. Price transparency display 240 is a graphical user interface that makes it easier for the user of client device 226 to quickly understand whether the price quoted for service 224 is fair or not in real-time. Fairness price indicator may be, for example, a color-coded indicator. For example, a red indicator may mean that the price quoted for service 224 is higher than an acceptable range of variation from the determined average price for service 224, a yellow indicator may mean that the price quoted for service 224 is within the acceptable range of variation from the determined average price for service 224, and a green indicator may mean that the price quoted for service 224 is lower than the acceptable range of variation from the determined average price for service 224.

Price transparency manager 218 may include graphical input button 244 in price transparency display 240. Price transparency manager 218 includes graphical input button 244 within price transparency display 240 when price transparency manager 218 determines that a price quoted for a particular service (e.g., service 224) is an unfair price. The user of client device 226 may activate graphical input button 244 (e.g., using a mouse click over graphical input button 224) to send a complaint to service provider 222 regarding the unfair price for service 224 and a summary of why price transparency manager 218 determined that the quoted price was unfair.

Further, price transparency manager 218 may send price transparency insight information to each of the other registered client devices that shared quoted prices for service 224 based on level of price transparency insights 246 corresponding to each of the other registered client devices. For example, price transparency manager 218 will share a level or amount of price transparency insight information with a particular client device based on the level or amount of price transparency information that particular client device shared with the service provider. For example, if a user of a particular client device opted in a corresponding price transparency policy to send only a limited set of data to the service provider, then price transparency manager 218 only shares that same limited set of data with that particular client device regarding the price quoted to client device 226 for service 224.

Communications unit 210, in this example, provides for communication with other computers, data processing systems, and devices via a network, such as network 102 in FIG. 1. Communications unit 210 may provide communications through the use of both physical and wireless communications links. The physical communications link may utilize, for example, a wire, cable, universal serial bus, or any other physical technology to establish a physical communications link for data processing system 200. The wireless communications link may utilize, for example, shortwave, high frequency, ultra high frequency, microwave, wireless fidelity (Wi-Fi), Bluetooth® technology, global system for mobile communications (GSM), code division multiple access (CDMA), second-generation (2G), third-generation (3G), fourth-generation (4G), 4G Long Term Evolution (LTE), LTE Advanced, fifth-generation (5G), or any other wireless communication technology or standard to establish a wireless communications link for data processing system 200.

Input/output unit 212 allows for the input and output of data with other devices that may be connected to data processing system 200. For example, input/output unit 212 may provide a connection for user input through a keypad, a keyboard, a mouse, a microphone, and/or some other suitable input device. Display 214 provides a mechanism to display information to a user and may include touch screen capabilities to allow the user to make on-screen selections through user interfaces or input data, for example.

Instructions for the operating system, applications, and/or programs may be located in storage devices 216, which are in communication with processor unit 204 through communications fabric 202. In this illustrative example, the instructions are in a functional form on persistent storage 208. These instructions may be loaded into memory 206 for running by processor unit 204. The processes of the different embodiments may be performed by processor unit 204 using computer-implemented instructions, which may be located in a memory, such as memory 206. These program instructions are referred to as program code, computer usable program code, or computer readable program code that may be read and run by a processor in processor unit 204. The program instructions, in the different embodiments, may be embodied on different physical computer readable storage devices, such as memory 206 or persistent storage 208.

Program code 248 is located in a functional form on computer readable media 250 that is selectively removable and may be loaded onto or transferred to data processing system 200 for running by processor unit 204. Program code 248 and computer readable media 250 form computer program product 252. In one example, computer readable media 250 may be computer readable storage media 254 or computer readable signal media 256. Computer readable storage media 254 may include, for example, an optical or magnetic disc that is inserted or placed into a drive or other device that is part of persistent storage 208 for transfer onto a storage device, such as a hard drive, that is part of persistent storage 208. Computer readable storage media 254 also may take the form of a persistent storage, such as a hard drive, a thumb drive, or a flash memory that is connected to data processing system 200. In some instances, computer readable storage media 254 may not be removable from data processing system 200.

Alternatively, program code 248 may be transferred to data processing system 200 using computer readable signal media 256. Computer readable signal media 256 may be, for example, a propagated data signal containing program code 248. For example, computer readable signal media 256 may be an electro-magnetic signal, an optical signal, and/or any other suitable type of signal. These signals may be transmitted over communication links, such as wireless communication links, an optical fiber cable, a coaxial cable, a wire, and/or any other suitable type of communications link. In other words, the communications link and/or the connection may be physical or wireless in the illustrative examples. The computer readable media also may take the form of non-tangible media, such as communication links or wireless transmissions containing the program code.

In some illustrative embodiments, program code 248 may be downloaded over a network to persistent storage 208 from another device or data processing system through computer readable signal media 256 for use within data processing system 200. For instance, program code stored in a computer readable storage media in a data processing system may be downloaded over a network from the data processing system to data processing system 200. The data processing system providing program code 248 may be a server computer, a client computer, or some other device capable of storing and transmitting program code 248.

The different components illustrated for data processing system 200 are not meant to provide architectural limitations to the manner in which different embodiments may be implemented. The different illustrative embodiments may be implemented in a data processing system including components in addition to, or in place of, those illustrated for data processing system 200. Other components shown in FIG. 2 can be varied from the illustrative examples shown. The different embodiments may be implemented using any hardware device or system capable of executing program code. As one example, data processing system 200 may include organic components integrated with inorganic components and/or may be comprised entirely of organic components excluding a human being. For example, a storage device may be comprised of an organic semiconductor.

As another example, a computer readable storage device in data processing system 200 is any hardware apparatus that may store data. Memory 206, persistent storage 208, and computer readable storage media 254 are examples of physical storage devices in a tangible form.

In another example, a bus system may be used to implement communications fabric 202 and may be comprised of one or more buses, such as a system bus or an input/output bus. Of course, the bus system may be implemented using any suitable type of architecture that provides for a transfer of data between different components or devices attached to the bus system. Additionally, a communications unit may include one or more devices used to transmit and receive data, such as a modem or a network adapter. Further, a memory may be, for example, memory 206 or a cache such as found in an interface and memory controller hub that may be present in communications fabric 202.

Typically, online web-based and mobile application-based services often include preferential pricing, surge pricing, and other mechanisms to retain or obtain more revenue from a customer, which is often based on an algorithm calculating the likelihood of success that the customer will accept a quoted price. For example, an online taxi booking application may utilize surge pricing, but how does an online customer really know that a "surge" (i.e., increased fare because there is a real-time shortage of a supply of taxis at that location) currently exists. Further, how do customers know whether or not an algorithm is exploiting a dependence on the service to artificially inflate fares/prices. Similarly, online advertising platforms share "impressions" regarding online advertisements to help price these advertisements. However, how do the service providers posting these advertisements know whether the pricing is fair.

Illustrative embodiments enable a collaborative opt-in aggregation for sharing real-time likelihood that a quoted price for a service is "fair" based on comparison of other real-time price quotes for the same service. In addition, illustrative embodiments allow finer grain control over certain services, if a user chooses to, by sharing more anonymized, detailed information. The detailed information is anonymized in that a user's identity is not disclosed in that information.

The user selects a service application (e.g., taxi booking application), which is located on the user's device, that the user wants to utilize for service price transparency and registers that application (i.e., the application-device pair) with a server hosting the price transparency service of illustrative embodiments. It should be noted that the user may register multiple service applications loaded on the user's device. However, the user registers each service application (i.e., each particular application-device pair) separately. Further, the user may register multiple devices (e.g., smart phone, laptop computer, and desktop computer) having the same and/or different service applications loaded. In other words, the user may register multiple, different application-device pairs with the price transparency server.

Furthermore, the user approves or selects which data to share with the price transparency server and service provider. The price transparency server determines minimum data requirements, which are set by a corresponding price transparency policy, for each respective service application registered by its associated service provider. For example, service applications, such as taxi booking applications, often request privileges from the user's device, such as, for example, allowing access to geolocation information (e.g., global positioning system (GPS) coordinates) corresponding to the user's device. As a result, the user must allow sharing of that data (i.e., minimum data requirement for that particular application set by the price transparency policy) for the service to work. Also, depending on the type and amount of the data shared, the price transparency server can increase personalization of price transparency aggregations for a particular user.

Transparency server maintains a register of each supported application and its corresponding service provider. Users register for the price transparency service with the server and provide their data sharing settings per application-device pair. The server sends real-time price transparency updates to a user each time a registered application corresponding to that user requests data from a service provider corresponding to the registered application requesting the data.

Upon registration, the server installs a price transparency agent on the user's device to enable communication with the server. For example, the price transparency agent on a personal computer may be implemented via a plugin in a web browser or thin client on the user's device. In addition, the price transparency server may be configured to support multiple registered service providers and services. Alternatively, the price transparency server may be configured to support only one registered service. In other words, one or more price transparency servers would be dedicated for each particular registered service.

The price transparency policy defines possible granularity and levels of user personalization the price transparency server can support for a particular service. For each level of user personalization, the price transparency policy details the type and amount of the information to be collected from the user's device for a respective service. Depending on the user's selected level of personalization, the transparency server enforces the transparency policy for the requested service on the user's device.

The price transparency server aggregates real-time incoming quoted prices from user devices to determine, for example the average, median, minimum, and maximum of the quoted prices based on defined clusters or groups of users. The price transparency server may define clusters or groups of users based on, for example, price transparency data being shared with users according to price transparency policies. In addition, the price transparency server may generate other information, such as service pricing trends over time, to predict prices for inadequate or missing comparative pricing data samples. The price transparency server then shares the price transparency data at the appropriate personalization/granularity, with each registered user (i.e., each registered application-device pair) subscribed to a particular service, based on a particular user's information sharing settings. The price transparency server may also utilize time duration for analysis and number of data sample points as parameters for quoted price aggregation by the price transparency server.

As an example use case, the transparency server supports a taxi booking application that has dynamic pricing. User 1 opts-in to share all data from the taxi booking application loaded on client device 1 (e.g., personal smart phone) corresponding to user 1. For this specific example, all data shared includes: geographic location (e.g., GPS coordinates) of device 1, pickup site, drop-off destination, payment method, taxi usage patterns of user 1, and the like. In addition, user 1 opts-in to share no data from the taxi booking application loaded on client device 2 (business desktop computer) corresponding to user 1. User 2 also opts-in to share a limited or defined set of data from the taxi booking application loaded on client device 1 corresponding to user 2. The limited or defined set of data to be shared may include, for example, location and time information only.

When user 1 requests taxi service using the taxi booking application on client device 1, user 1 sees the average price of a taxi for same or similar route or route of similar distance from a nearest location. Further, user 1 sees the price quoted by the taxi provider application. The price transparency server highlights whether the quoted price is fair or not using, for example, a set of indicators, such as different colors. The color indicators may be, for example, a red color indicating that the quoted price is higher than the average for same or similar routes, a yellow color indicating that the quoted price is within an acceptable range of variation from the average, and a green color indicating that the quoted price is lower than the average.

If the quoted price is higher than the average, then the price transparency server provides a graphic button in the price transparency display on client device 1 that enables user 1 to send an automated complaint to the taxi service provider's customer service center, with a full summary of why the price transparency server determined that the quoted price was an unfair price. Furthermore, the price transparency server shares the quoted price with a set of other opted-in users who match user 1's opt-in attributes. The price transparency server will not share personal details regarding the other users with any other user. In addition, users can choose to opt-out of the complaint service during registration via a corresponding price transparency policy. For example, a user may not have access to the complaint service if the user opts-out. This is a price transparency policy implementation decision made by the user.

Irrespective of whether the price transparency server displays the quoted price in a red, yellow, or green color indicator, the price transparency server continuously updates, in real-time, pricing statistics to generate future price transparency alerts. Further, user 1, using client device 2 corresponding to user 1, may only see very limited or no price transparency data since user 1 opted not to share any data from the taxi booking application. Similarly, user 2, using client device 1 corresponding to user 2, will receive less price transparency data from the price transparency server than user 1 did on client device 1 since user 2 opted to share a limited set of data from the taxi booking application and user 1 opted to share all data.

With reference now to FIG. 3, a diagram illustrating an example of a price transparency system is depicted in accordance with an illustrative embodiment. Price transparency system 300 may be implemented in a network of data processing systems, such as network data processing system 100 in FIG. 1. Price transparency system 300 is a system of hardware and software components for determining whether a quoted price for a service is fair or unfair.

In this example, price transparency system 300 includes price transparency server 302, client device 304, client device 306, and client device 308. Price transparency server 302 may be, for example, server 104 in FIG. 1 or data processing system 200 in FIG. 2. Client device 304, client device 306, and client device 308 may be, for example, client 110, client 112, and client 114 in FIG. 1.

Price transparency server 302 includes price transparency manager 310, such as, for example, price transparency manager 218 in FIG. 2, to aggregate real-time quoted prices corresponding to registered service applications to determine whether a price quoted to a particular client device for a particular service is fair based on quoted price comparison and indicate whether the quoted price is fair or not within a price transparency display on the particular client device using a fairness price indicator. Price transparency server 302 also includes a registry of service application-client device pairs. For example, price transparency server 302 includes transparency register 312 for service application 1, transparency register 314 for service application 2, and transparency register 316 for service application XYZ. However, it should be noted that price transparency server 302 may include more or fewer registrations than shown. For example, price transparency server 302 may only support one service application for one service provider. Alternatively, price transparency server 302 may support any number of service applications for one or more different service providers.

In this example, user 318 is associated with client device 304, user 320 is associated with client device 306, and user 322 is associated with client device 308. In addition, price transparency manager 310 installs price transparency agent 324 on client device 304, price transparency agent 326 on client device 306, and price transparency agent 328 on client device 308 after receiving registrations from each respective client device. It should be noted that price transparency agents 324, 326, and 328 may be the same type of software agent installed on client devices 304, 306, and 308. Price transparency agents 324, 326, and 328 enable communication between client devices 304, 306, and 308 and price transparency server 302.

In this example, user 318 registers service application 1 330 and service application 25 332 located on client device 304 with price transparency manager 310. Further, user 318 defines price transparency policy 334, such as, for example, price transparency policy 232 in FIG. 2, for each of service application 1 330 and service application 332 and sends the price transparency policies to price transparency manager 310 for enforcement on client device 304. Price transparency policy 334 determines the type and amount of information to be shared from each respective service application.

Similarly, user 320 registers service application 1 336, service application 2 338, and service application 22 340 located on client device 306 with price transparency manager 310. User 320 also defines price transparency policy 342 for each of service application 1 336, service application 2 338, and service application 22 340 and sends the price transparency policies to price transparency manager 310 for enforcement on client device 306. User 322 registers service application 1 344 located on client device 308 with price transparency manager 310. In addition, user 322 defines price transparency policy 346 for service application 1 344 and sends the price transparency policy to price transparency manager 310 for enforcement on client device 308.

Furthermore, it should be noted that service application 1 330 located on client device 304, service application 1 336 located on client device 306, and service application 1 344 located on client device 308 may be the same type of service application requesting the same type of service. Alternatively, service application 1 330, service application 1 336, and service application 1 344 may be different types of service applications requesting different types of services.

Figure 4A:
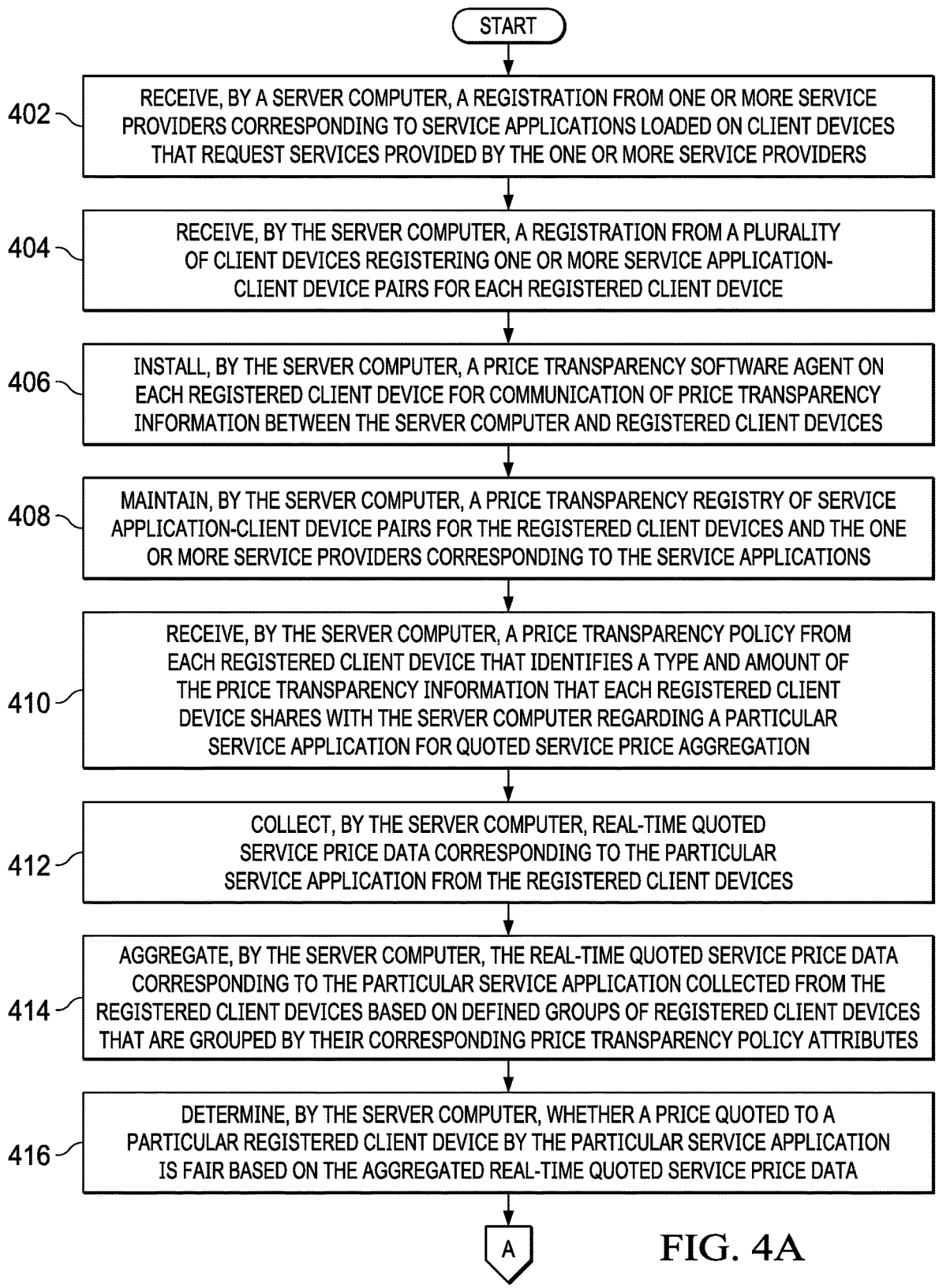
FIGS. 4A-4B are a flowchart illustrating a process for a price transparency server in accordance with an illustrative embodiment.
Figure 4B:
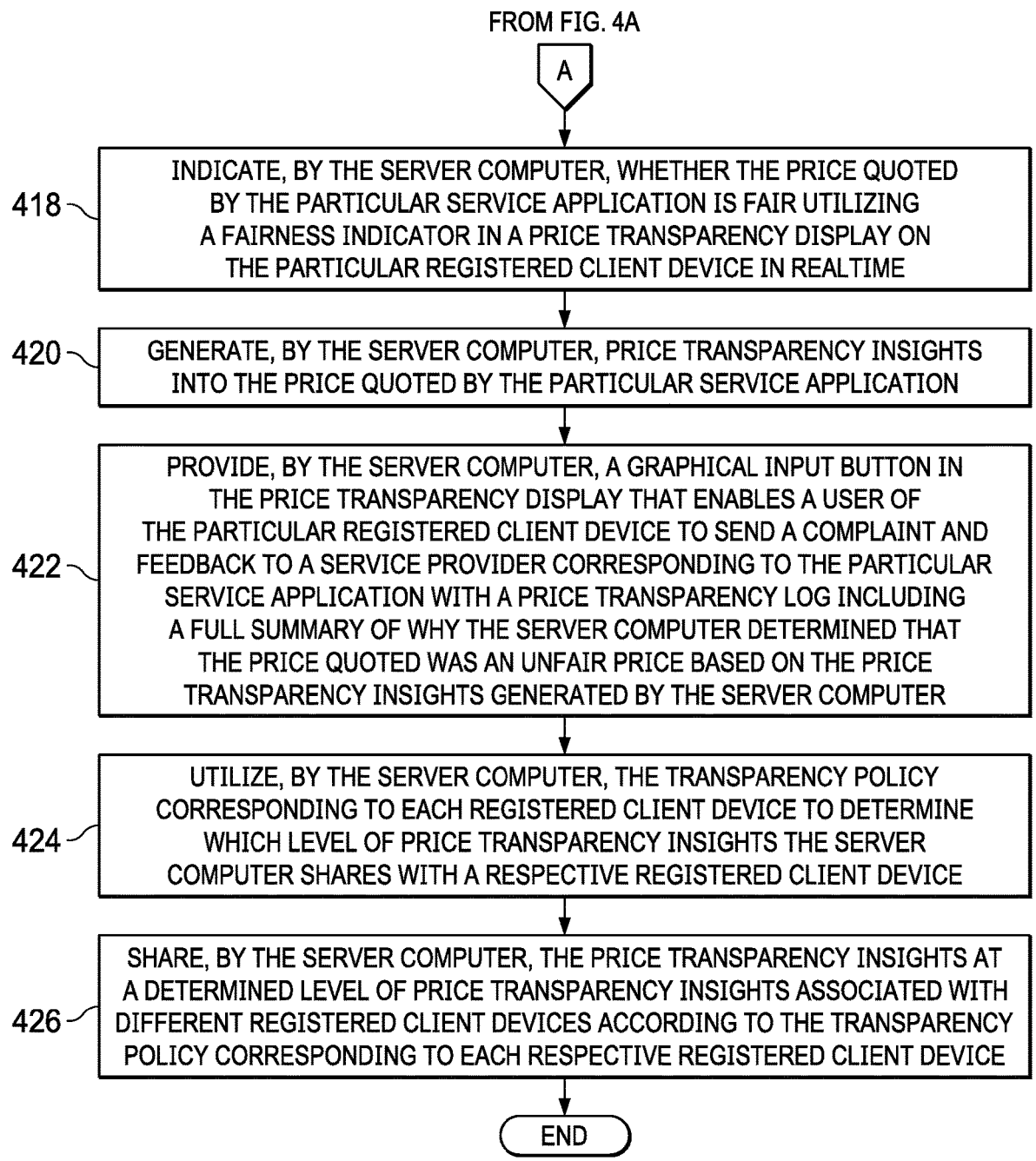

With reference now to FIGS. 4A-4B, a flowchart illustrating a process for a price transparency server is shown in accordance with an illustrative embodiment. The process shown in FIGS. 4A-4B may be implemented in a server computer, such as, for example, server 104 in FIG. 1, data processing system 200 in FIG. 2, or price transparency server 302 in FIG. 3.

The process begins when the server computer receives a registration from one or more service providers corresponding to service applications loaded on client devices that request services provided by the one or more service providers (step 402). In addition, the server computer receives a registration from a plurality of client devices registering one or more service application-client device pairs for each registered client device (step 404). In response to receiving the registrations, the server computer installs a price transparency software agent on each registered client device for communication of price transparency information between the server computer and registered client devices (step 406). The price transparency software agent may be, for example, price transparency agent 322 in FIG. 3.

The server computer maintains a price transparency registry of service application-client device pairs for the registered client devices and the one or more service providers corresponding to the service applications (step 408). Further, the server computer receives a price transparency policy from each registered client device that identifies a type and amount of the price transparency information that each registered client device shares with the server computer regarding a particular service application for quoted service price aggregation for that particular service application (step 410). The price transparency policies may be, for example, policy 332, policy 340, and policy 344 in FIG. 3.

The server computer collects real-time quoted service price data corresponding to the particular service application from the registered client devices (step 412). Furthermore, the server computer aggregates the real-time quoted service price data corresponding to the particular service application collected from the registered client devices based on defined groups of registered client devices that are grouped by their corresponding price transparency policy attributes (step 414). Moreover, the server computer determines whether a price quoted to a particular registered client device by the particular service application is fair based on the aggregated real-time quoted service price data (step 416). It should be noted that the price quoted to the particular registered client device may be personalized for a user corresponding to that particular registered client device.

The server computer indicates whether the price quoted by the particular service application is fair utilizing a fairness indicator in a price transparency display on the particular registered client device in real-time (step 418). The price transparency display is a graphical user interface that the server computer generates to make it easier for the client device user to quickly understand whether the quoted price for the service is fair or unfair. The server computer also generates price transparency insights into the price quoted by the particular service application (step 420). The price transparency insights are details, such as, for example, geographic location of where the service is to be performed, time the service was requested, duration of the service, number of requests for the service at that point in time, average, minimum, and maximum quoted prices for the service at that point in time, and the like, which correspond to the quoted price for that particular service received by the particular registered client device.

In addition, the server computer provides a graphical input button in the price transparency display that enables the user of the particular registered client device to send a complaint and feedback to a service provider corresponding to the particular service application with a price transparency log including a full summary of why the server computer determined that the price quoted was an unfair price based on the price transparency insights generated by the server computer (step 422). Further, the server computer utilizes the transparency policy corresponding to each registered client device to determine which level of price transparency insights the server computer shares with a respective registered client device (step 424). The price transparency insight levels may be, for example, share all insight data, share a limited set of insight data, or share no insight data with a specific client device. The server computer shares the price transparency insights at a determined level of price transparency insights associated with different registered client devices according to the transparency policy corresponding to each respective registered client device (step 426). Thereafter, the process terminates.

Figure 5:
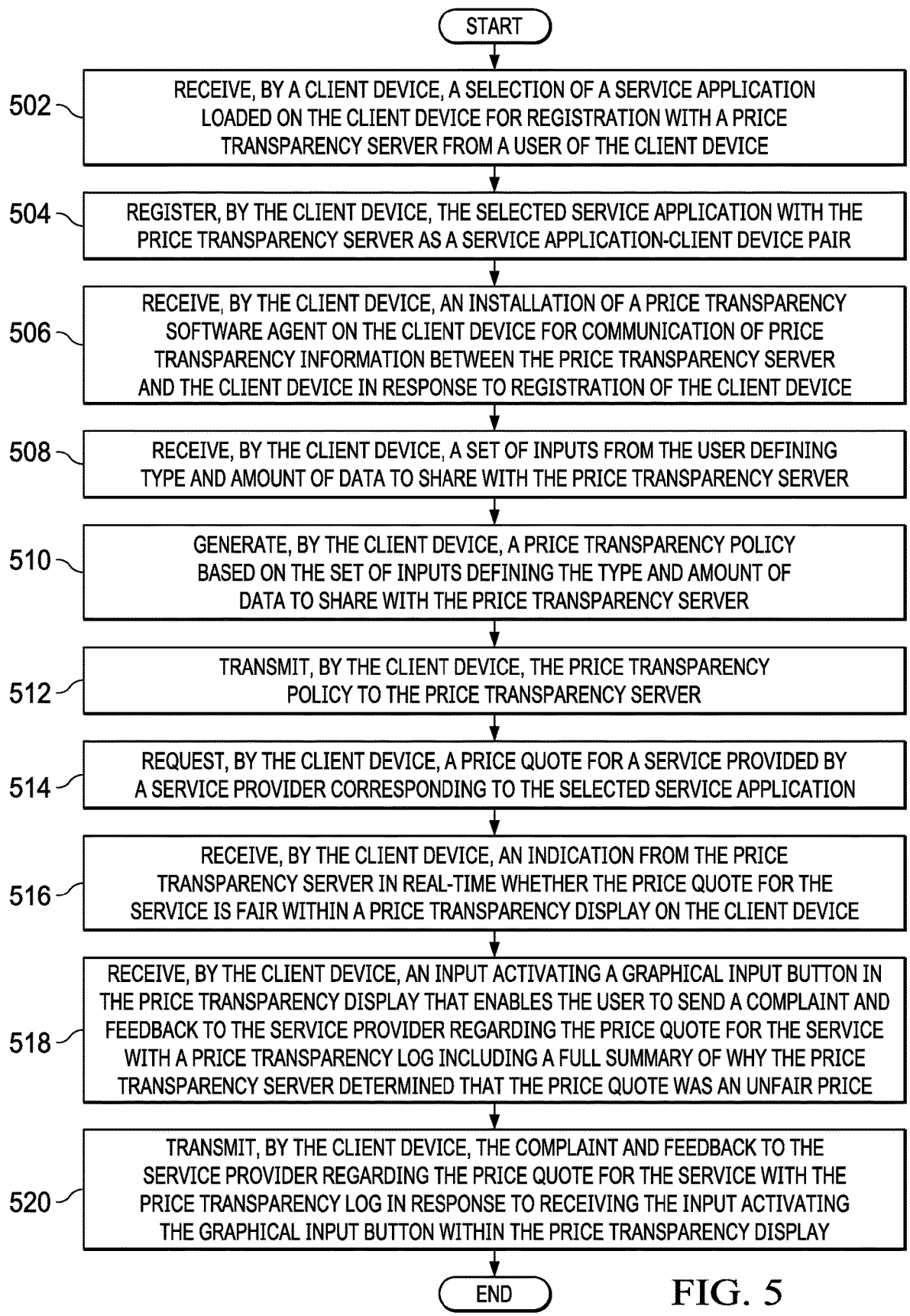
FIG. 5 is a flowchart illustrating a process for a price transparency client in accordance with an illustrative embodiment.

With reference now to FIG. 5, a flowchart illustrating a process for a price transparency client is shown in accordance with an illustrative embodiment. The process shown in FIG. 5 may be implemented in a client device, such as, for example, client 110 in FIG. 1 or client device 304 in FIG. 3.

The process begins when the client device receives from a user of the client device a selection of a service application loaded on the client device for registration with a price transparency server (step 502). The user of the client device may be, for example, user 316 in FIG. 3. The selected service application may be, for example, application 1 328 in FIG. 3. The price transparency server may be, for example, price transparency server 302 in FIG. 3.

The client device registers the selected service application with the price transparency server as a service application-client device pair (step 504). Afterward, the client device receives an installation of a price transparency software agent on the client device for communication of price transparency information between the price transparency server and the client device in response to registration of the client device (step 506). The price transparency software agent may be, for example, price transparency agent 322 in FIG. 3.

In addition, the client device receives a set of inputs from the user defining type and amount of data to share with the price transparency server (step 508). The client device generates a price transparency policy, such as policy 332 in FIG. 3, based on the set of inputs defining the type and amount of data to share with the price transparency server (step 510). The client device transmits the price transparency policy to the price transparency server (step 512).

Subsequently, the client device requests a price quote for a service provided by a service provider corresponding to the selected service application (step 514). The client device receives within a price transparency display on the client device an indication from the price transparency server in real-time whether the price quote for the service is fair or not (step 516). The client device receives an input activating a graphical input button in the price transparency display that enables the user to send a complaint and feedback to the service provider regarding the price quote for the service with a price transparency log including a full summary of why the price transparency server determined that the price quote was an unfair price (step 518). The client device transmits the complaint and feedback to the service provider regarding the price quote for the service with the price transparency log in response to receiving the input activating the graphical input button within the price transparency display (step 520). Thereafter, the process terminates.

Thus, illustrative embodiments of the present invention provide a computer-implemented method, computer system, and computer program product for price transparency via user opt-in aggregation of real-time quoted prices for the same service to determine whether a quoted price received by the user is fair or not based on comparison with other quoted prices received by other users for the same service. Thus, illustrative embodiments provide user-personalized granular intelligence based on real-time service pricing. In other words, illustrative embodiments quickly identify personalized price quotes having unfair pricing from service providers that provide services with varying prices depending on current real-time service demand (e.g., taxi fares, hotel room pricing, airfares, and the like) based on real-time aggregation of quoted prices, which were received by a plurality of registered clients, for that same service or similar services.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer-implemented method for price transparency via aggregation of real-time quoted prices, the computer-implemented method comprising:

collecting, by a computer, real-time quoted service price data corresponding to an online service application from a plurality of registered client devices of online service application customers in real-time via a network using a price transparency agent uploaded by the computer to each of the plurality of registered client devices enabling two-way communication between the computer and the plurality of registered client devices, the price transparency agent implemented via a plugin in a web browser on the plurality of registered client devices;

aggregating, by the computer, the real-time quoted service price data corresponding to the online service application, wherein the aggregated real-time quoted service price data corresponding to the online service application is aggregated based on defined groups of registered client devices of online service application customers grouped by their corresponding price transparency policy attributes setting type and amount of data to send from the online service application to a service provider;

determining, by the computer, whether a price quoted to a client device of an online service application customer by the online service application is fair or unfair based on the aggregated real-time quoted service price data; and indicating, by the computer, that the price quoted to the client device of the online service application customer by the online service application is a fair price or an unfair price by utilizing a color-coded fairness indicator within a price transparency display on the client device in real-time via the network, wherein the price transparency display is a graphical user interface that the computer generates to make it easier for the online service application customer of the client device to quickly understand whether the price quoted by the online service application is fair or unfair in real-time.

2. The computer-implemented method of claim 1 further comprising:

utilizing, by the computer, a transparency policy that corresponds to each registered client device providing the real-time quoted service price data to determine a level of price transparency insights to share with a respective registered client device; and sharing, by the computer, price transparency insights at a determined level of price transparency insights associated with each respective registered client device according its corresponding transparency policy.

3. The computer-implemented method of claim 2, wherein the determined level of price transparency insights is selected from a group consisting of share all insight data, share a limited set of insight data, and share no insight data with a respective registered client device.

4. The computer-implemented method of claim 2 further comprising:

generating, by the computer, the price transparency insights into the price quoted by the online service application, wherein the price transparency insights include geographic location of where a service corresponding to the online service application is to be performed, time the service was requested, duration of the service, number of requests for the service at that point in time, and average, minimum, and maximum quoted prices for the service at that point in time.

5. The computer-implemented method of claim 1 further comprising:
receiving, by the computer, a registration from one or more service providers corresponding to online service applications loaded on registered client devices that request services provided by the one or more service providers; and
receiving, by the computer, a registration from the plurality of registered client devices registering one or more service application-client device pairs for each registered client device.

6. The computer-implemented method of claim 5 further comprising:
installing, by the computer, a price transparency agent on each registered client device for communication of price transparency information between the computer and each registered client device; and
maintaining, by the computer, a price transparency registry of service application-client device pairs for the registered client devices and the one or more service providers corresponding to the online service applications.

7. The computer-implemented method of claim 1 further comprising:
receiving, by the computer, a price transparency policy from each registered client device, wherein the price transparency policy identifies a type and amount of price transparency information that each registered client device shares with the computer regarding the online service application.

8. The computer-implemented method of claim 1 further comprising:
responsive to determining that the price quoted to the client device by the online service application is unfair, providing, by the computer, a graphical input button within the price transparency display on the client device that enables a user of the client device to send a complaint to the service provider corresponding to the online service application with a price transparency log, wherein the price transparency log includes a full summary of why the computer determined that the price quoted was an unfair price, and wherein the computer determined that the price quoted was an unfair price based on price transparency insights generated by the computer.

9. A computer system for price transparency via aggregation of real-time quoted prices, the computer system comprising:
a bus system;
a storage device connected to the bus system, wherein the storage device stores program instructions; and
a processor connected to the bus system, wherein the processor executes the program instructions to:
collect real-time quoted service price data corresponding to an online service application from a plurality of registered client devices of online service application customers in real-time via a network using a price transparency agent uploaded by the computer system to each of the plurality of registered client devices enabling two-way communication between the computer system and the plurality of registered client devices, the price transparency agent implemented via a plugin in a web browser on the plurality of registered client devices;
aggregate the real-time quoted service price data corresponding to the online service application, wherein the aggregated real-time quoted service price data corresponding to the online service application is aggregated based on defined groups of registered client devices of online service application customers grouped by their corresponding price transparency policy attributes setting type and amount of data to send from the online service application to a service provider;
determine whether a price quoted to a client device of an online service application customer by the online service application is fair or unfair based on the aggregated real-time quoted service price data; and
indicate that the price quoted to the client device of the online service application customer by the online service application is a fair price or an unfair price by utilizing a color-coded fairness indicator within a price transparency display on the client device in real-time via the network, wherein the price transparency display is a graphical user interface that the computer system generates to make it easier for the online service application customer of the client device to quickly understand whether the price quoted by the online service application is fair or unfair in real-time.

10. The computer system of claim 9, wherein the processor further executes the program instructions to:
utilize a transparency policy that corresponds to each registered client device providing the real-time quoted service price data to determine a level of price transparency insights to share with a respective registered client device; and
share price transparency insights at a determined level of price transparency insights associated with each respective registered client device according its corresponding transparency policy.

11. The computer system of claim 10, wherein the determined level of price transparency insights is selected from a group consisting of share all insight data, share a limited set of insight data, and share no insight data with a respective registered client device.

12. A computer program product for price transparency via aggregation of real-time quoted prices, the computer program product comprising a computer readable storage medium having program instructions embodied therewith, the program instructions executable by a computer to cause the computer to perform a method comprising:
collecting, by the computer, real-time quoted service price data corresponding to an online service application from a plurality of registered client devices of online service application customers in real-time via a network using a price transparency agent uploaded by the computer to each of the plurality of registered client devices enabling two-way communication between the computer and the plurality of registered client devices, the price transparency agent implemented via a plugin in a web browser on the plurality of registered client devices;
aggregating, by the computer, the real-time quoted service price data corresponding to the online service application, wherein the aggregated real-time quoted service price data corresponding to the online service application is aggregated based on defined groups of registered client devices of online service application customers grouped by their corresponding price transparency policy attributes setting type and amount of data to send from the online service application to a service provider;

determining, by the computer, whether a price quoted to a client device of an online service application customer by the online service application is fair or unfair based on the aggregated real-time quoted service price data; and indicating, by the computer, that the price quoted to the client device of the online service application customer by the online service application is a fair price or an unfair price by utilizing a color-coded fairness indicator within a price transparency display on the client device in real-time via the network, wherein the price transparency display is a graphical user interface that the computer generates to make it easier for the online service application customer of the client device to quickly understand whether the price quoted by the online service application is fair or unfair in real-time.

13. The computer program product of claim 12 further comprising:

utilizing, by the computer, a transparency policy that corresponds to each registered client device providing the real-time quoted service price data to determine a level of price transparency insights to share with a respective registered client device; and sharing, by the computer, price transparency insights at a determined level of price transparency insights associated with each respective registered client device according its corresponding transparency policy.

14. The computer program product of claim 13, wherein the determined level of price transparency insights is selected from a group consisting of share all insight data, share a limited set of insight data, and share no insight data with a respective registered client device.

15. The computer program product of claim 13 further comprising:

generating, by the computer, the price transparency insights into the price quoted by the online service application, wherein the price transparency insights include geographic location of where a service corresponding to the online service application is to be performed, time the service was requested, duration of the service, number of requests for the service at that point in time, and average, minimum, and maximum quoted prices for the service at that point in time.

16. The computer program product of claim 12 further comprising:

receiving, by the computer, a registration from one or more service providers corresponding to online service applications loaded on registered client devices that request services provided by the one or more service providers; and receiving, by the computer, a registration from the plurality of registered client devices registering one or more service application-client device pairs for each registered client device.

17. The computer program product of claim 16 further comprising:

installing, by the computer, a price transparency agent on each registered client device for communication of price transparency information between the computer and each registered client device; and maintaining, by the computer, a price transparency registry of service application-client device pairs for the registered client devices and the one or more service providers corresponding to the online service applications.

18. The computer program product of claim 12 further comprising:

receiving, by the computer, a price transparency policy from each registered client device, wherein the price transparency policy identifies a type and amount of price transparency information that each registered client device shares with the computer regarding the online service application.

19. The computer-implemented method of claim 1 further comprising:

generating, by the computer, service pricing trends over time to predict prices for inadequate comparative pricing data samples.

* * * * *